United States Patent [19]

Soper

[11] Patent Number: 5,144,561
[45] Date of Patent: Sep. 1, 1992

[54] APPARATUS FOR SENSING A LENS BLANK AND A MACHINE INCLUDING SUCH APPARATUS

[75] Inventor: Peter H. H. Soper, Rugby, England

[73] Assignee: S. Jones-Robinson & Co., Gloucester, England

[21] Appl. No.: 424,255

[22] PCT Filed: Apr. 14, 1988

[86] PCT No.: PCT/GB88/00284
§ 371 Date: Nov. 3, 1989
§ 102(e) Date: Nov. 3, 1989

[87] PCT Pub. No.: WO88/08159
PCT Pub. Date: Oct. 20, 1988

[30] Foreign Application Priority Data

Apr. 15, 1987 [GB] United Kingdom ............ 8709127

[51] Int. Cl.$^5$ ............................................ G06F 15/46
[52] U.S. Cl. .......................... 364/474.35; 364/474.37; 51/165.71
[58] Field of Search ............ 364/474.35, 474.06, 364/474.01, 474.37; 51/101 LG, 105 LG, 106 LG, 124 L, 165.71; 29/327.3

[56] References Cited

U.S. PATENT DOCUMENTS

| | | | |
|---|---|---|---|
| 4,394,099 | 7/1983 | Santinelli | 51/101 X |
| 4,517,870 | 5/1985 | Kopp | 51/101 X |
| 4,653,233 | 3/1987 | Brueck | 51/124 |
| 4,680,998 | 7/1987 | Council, Jr. | 51/124 X |
| 4,769,954 | 9/1988 | Hatas et al. | 51/105 X |
| 4,829,715 | 5/1989 | Langlois et al. | 51/101 |
| 4,829,716 | 5/1989 | Ueda et al. | 51/124 X |
| 4,945,684 | 8/1990 | Wada et al. | 51/101 X |

Primary Examiner—Jerry Smith
Assistant Examiner—Allen M. Lo
Attorney, Agent, or Firm—Krass & Young

[57] ABSTRACT

A machine for machining a lens blank includes first and second lens blank holders which may be moved alternately between a loading station, where the lens blank can be loaded in the holder, and a machining station where the lens blank in the holder is to be machined. The machining of a lens blank at the machining station is controlled by a signal processor in response to signals from a lens blank sensing apparatus at the loading station. The sensing apparatus comprises means for sensing the position of a peripheral edge of the lens blank, and a plurality of probes engageable with different surface portions of the lens blank, means being provided for sensing the displacement of the probes and feeding to the signal processor output signals indicative of the displacement of the probes and hence indicative of the surface shape of the lens blank.

27 Claims, 14 Drawing Sheets

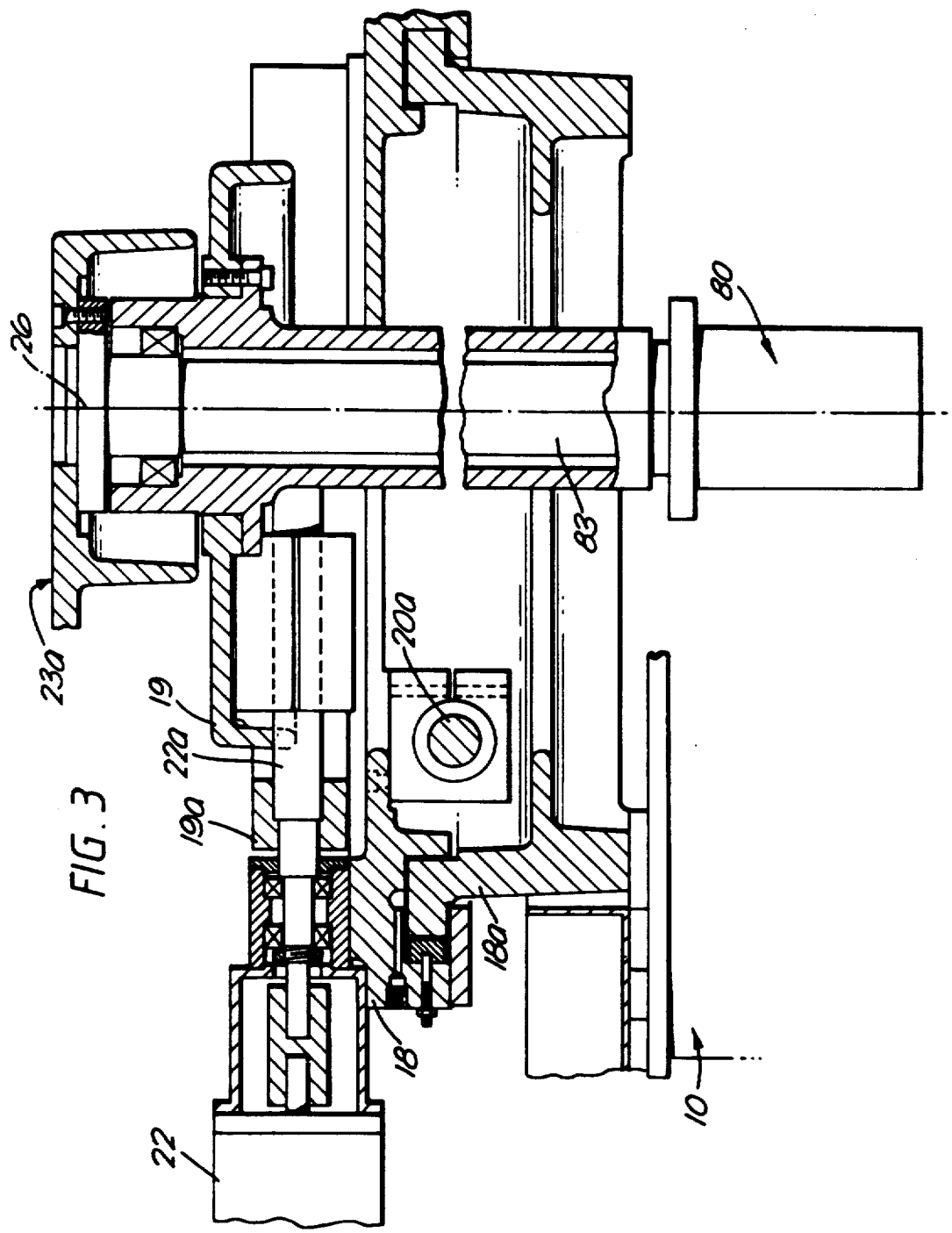

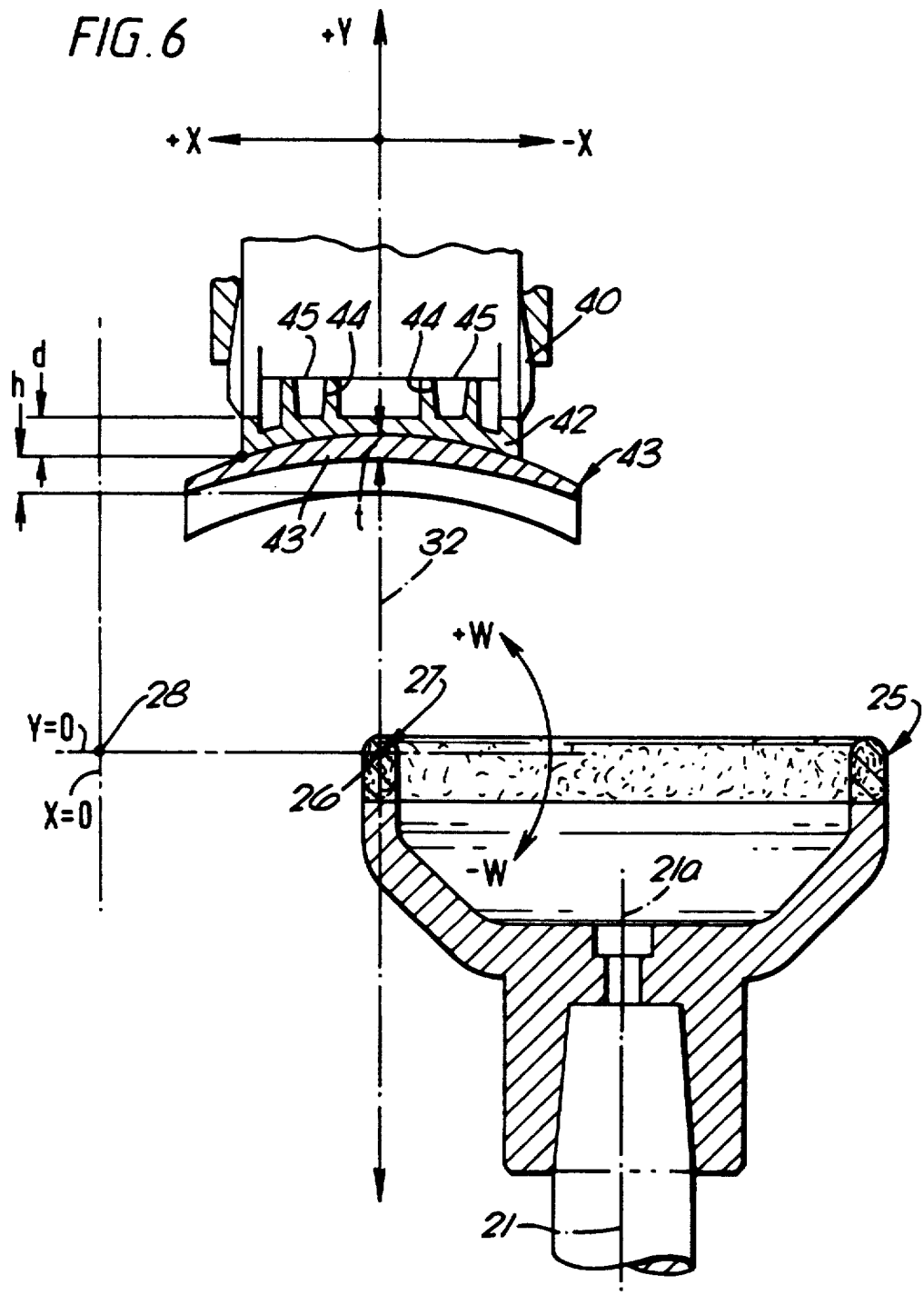

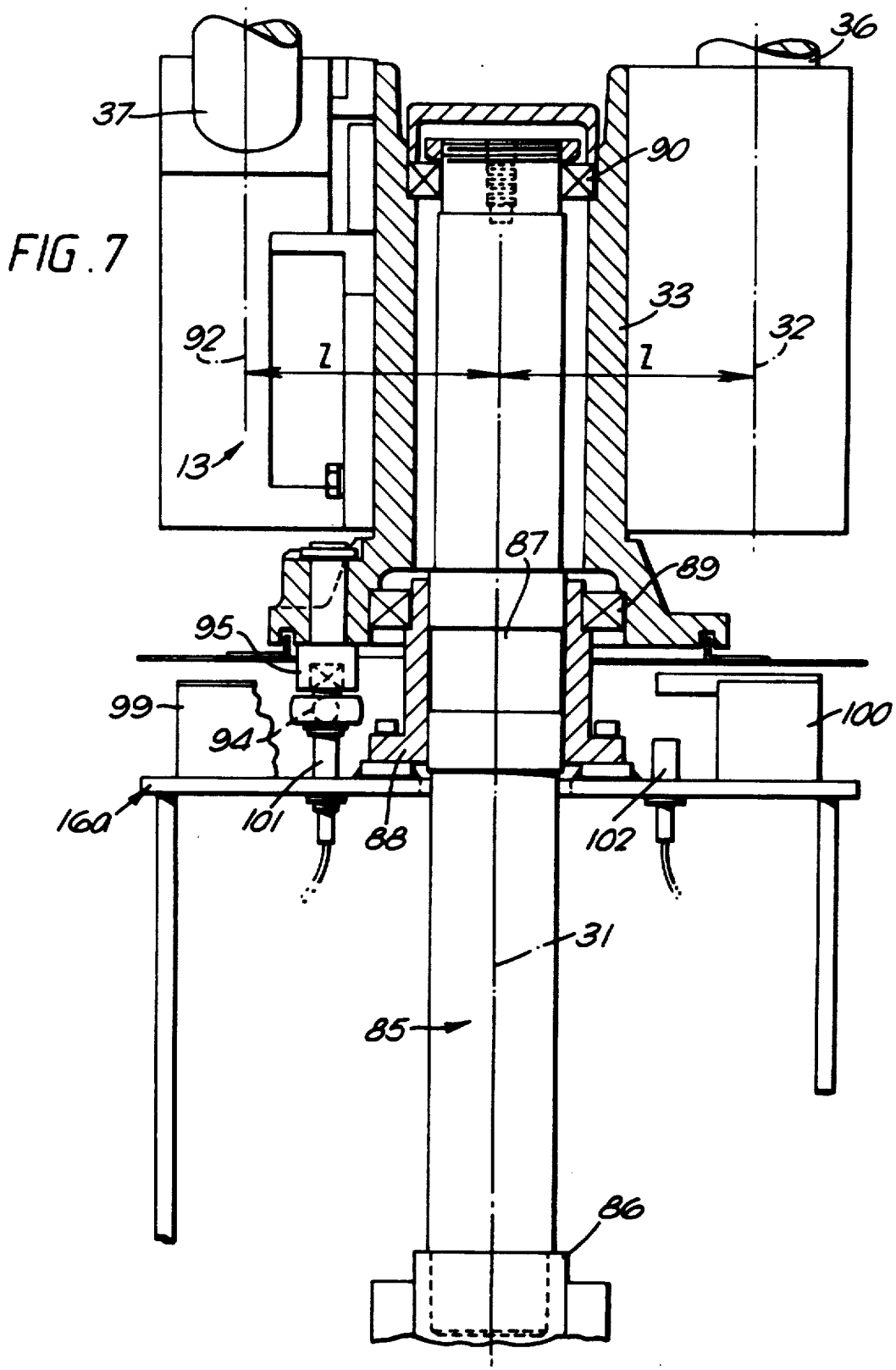

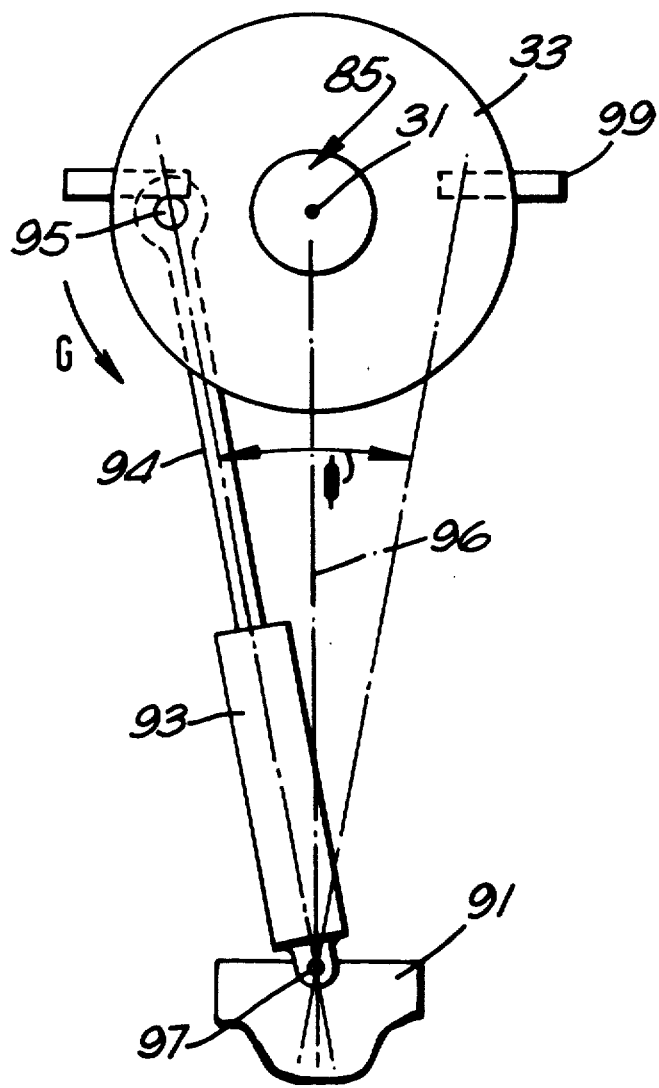

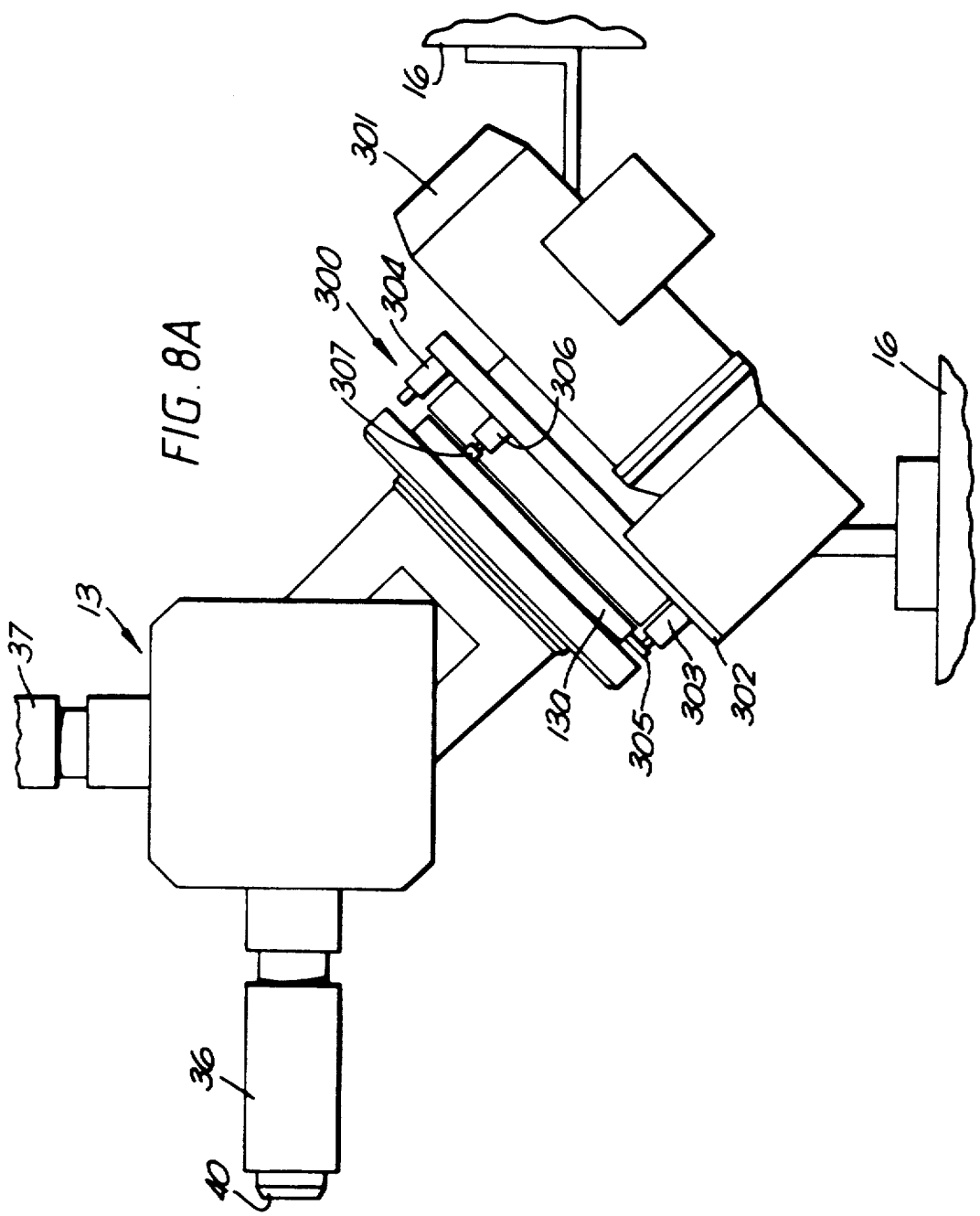

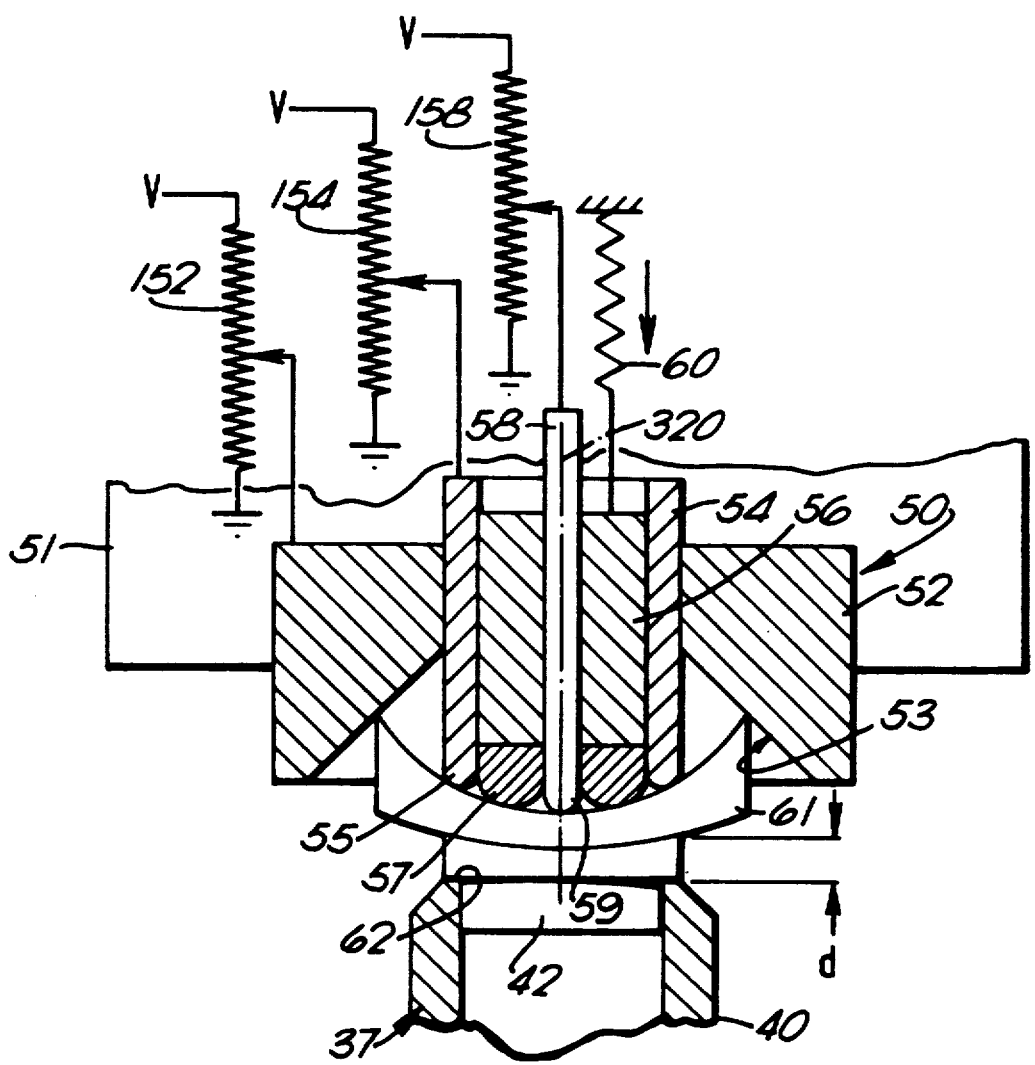

APPARATUS FOR SENSING A LENS BLANK AND A MACHINE INCLUDING SUCH APPARATUS

The invention relates to apparatus for sensing a lens blank and is particularly but not exclusively concerned with such apparatus in a machine for generating toric lens surfaces.

According to one aspect of the invention there is provided apparatus for sensing a lens blank including a plurality of sensor means which sense the positions of portions of the blank to enable signals to be produced dependent on the positions of said portions, and means for receiving signals from the sensor means.

According to the invention there is provided apparatus for sensing a lens blank including a plurality of sensor means which sense the positions of portions of the blank and means for receiving signals from the sensor means. Such an apparatus can be used to enable lens blank parameters to be obtained.

Preferably the sensor means includes first sensor means arranged to sense an edge of the blank and may also include second sensor means arranged to sense inboard surface portions of the blank, e.g., at centre and off-centre positions.

The sensor means may include a plurality of movable elements. The first sensor means may include an element having a frusto conical surface engageable with the edge of the lens blank whilst the second sensor means may include a plurality of probes. At least one of the probes may be arranged to engage a surface portion of the lens blank at an off-centre position. Another of the probes may be arranged to engage a surface portion of the lens blank at or adjacent a central position. The centre position refers to the physical centre position of the lens.

The probes may be parallel and mounted for axial movement relative to each other.

The sensor means may be mounted on a carriage which is preferably movable towards and away from the lens blank. Where the sensor means comprises a plurality of movable elements such as probes they may be movably mounted on the carriage. Preferably bias means such as springs may be provided for biasing the elements normally towards a datum position. When the elements are moved into engagement with the lens blank they are preferably displaced relative to each other by the surface of the lens against the bias means.

Each sensor means may also include a sensing device such as a potentiometer for providing the aforesaid signals.

The signals may be received by means such as a computer for processing the signals to provide an output preferably for controlling the machining of the lens blank. Preferably the signal processing means is arranged to receive data relevant to the lens to be formed from the lens blank which is computed with the signals received.

A support such as a collet chuck may be provided for the lens blank to align the lens blank with the sensor means. Preferably, the lens blank is aligned with its physical centre substantially in alignment with the element of the sensor means which engages the centre position of the lens surface.

Preferably a holding member is provided for holding the lens blank securely relative to the support when the sensing is taking place. The holding member may comprise a foot or pressure pad which may be movable against the lens surface. Preferably the holding member is movably mounted on the carriage so that when the carriage is operated to move the sensor means towards the lens blank, the holding member will be urged into engagement with the lens surface preferably in advance of the sensors. The holding member may be resiliently mounted on the carriage so that the urging of the holding against the lens surface will cause the holding member to react against its resilient bias. Where a probe is arranged to engage a surface portion of the lens blank at or adjacent the central position, the probe may be surrounded by a tube carrying or including the holding member.

Preferably, the aforesaid apparatus forms part of a machine for machining the lens blank, the machine including a holder for a lens blank, a machining station where the lens blank in the holder is to be machined, a loading station where the lens blank can be loaded in the holder for sensing by the lens blank sensing apparatus, holder moving means for moving the holder from the loading station to the machining station, and means for controlling the machining in response to signals including those received from the sensing apparatus.

Whilst it is envisaged that the lens blank which is being machined may be moved in a controlled manner relative to a tool to effect machining, we prefer to provide a movable mounting for the tool which is operated by a suitable drive means. The tool may be a cup-shaped grinding wheel.

Where said means for processing the signals is arranged to provide an output for controlling the machining of the lens blank, the output may be arranged to control the drive means.

Conveniently, the mounting may be arranged on two slides, preferably orthogonal slides, controlled by respective drive means.

The mounting may be movable in a rotational sense about an axis at right angles to the slides to enable the tool to be pivoted. Such pivotal movement may be effected by an associated drive means.

The aforesaid drive means may comprise stepper motors.

The holder may be carried by a mounting which may be indexable about an axis. The indexing axis may be inclined e.g., to 45° to the holder.

Preferably, a drive motor such as a ram or a rotary indexing unit is provided to effect indexing. Where a ram is used, the ram may drive the mounting part way about the indexing axis, the remainder of the indexing movement being effected by the momentum of the unit. Means such as micro switches may be used to control the amount of indexing movement. Preferably the drive motor operates in response to an output from the means for processing the signals.

The machine preferably includes a second holder for a second lens blank.

Preferably the holders are arranged so that when one of the holders is positioned at the loading station the other is positioned at the machining station.

Such a machine enables loading of one lens blank to take place while the other is being machined. Therefore as soon as machining of the first lens blank is complete the next one can be moved to the machining station. That arrangement is time saving as the machine can be working to machine a lens blank while the other lens blank is being loaded and sensed at the loading station.

Preferably said holder moving means is arranged to interchange the position of the holders.

The aforesaid mounting means may carry both holders which are preferably arranged one each side of the indexing axis.

Preferably the holder at the loading station extends vertically and the holder at the machine station extend horizontally.

Apparatus for sensing a lens blank in accordance with the invention and a machine including such apparatus, will now be described by way of example with reference to the accompanying drawings in which:

FIG. 3 is a cross-section of part of the machine on FIG. 2 on the line III—III in FIG. 2;

FIG. 6 is a diagrammatic view of a grinding wheel and lens blank showing various directions of movement of the wheel relative to a lens blank;

FIG. 7 is a cross-section through part of a tail-stock of the machine on the line VII—VII in FIG. 1;

FIG. 8 is a diagrammatic view of an indexing mechanism for a lens blank holder unit;

FIG. 8A is a diagrammatic view of an alternative indexing mechanism for the lens blank holder unit;

FIG. 9 is a diagrammatic cross-section through a lens blank sensing unit for the machine;

Figure 1:
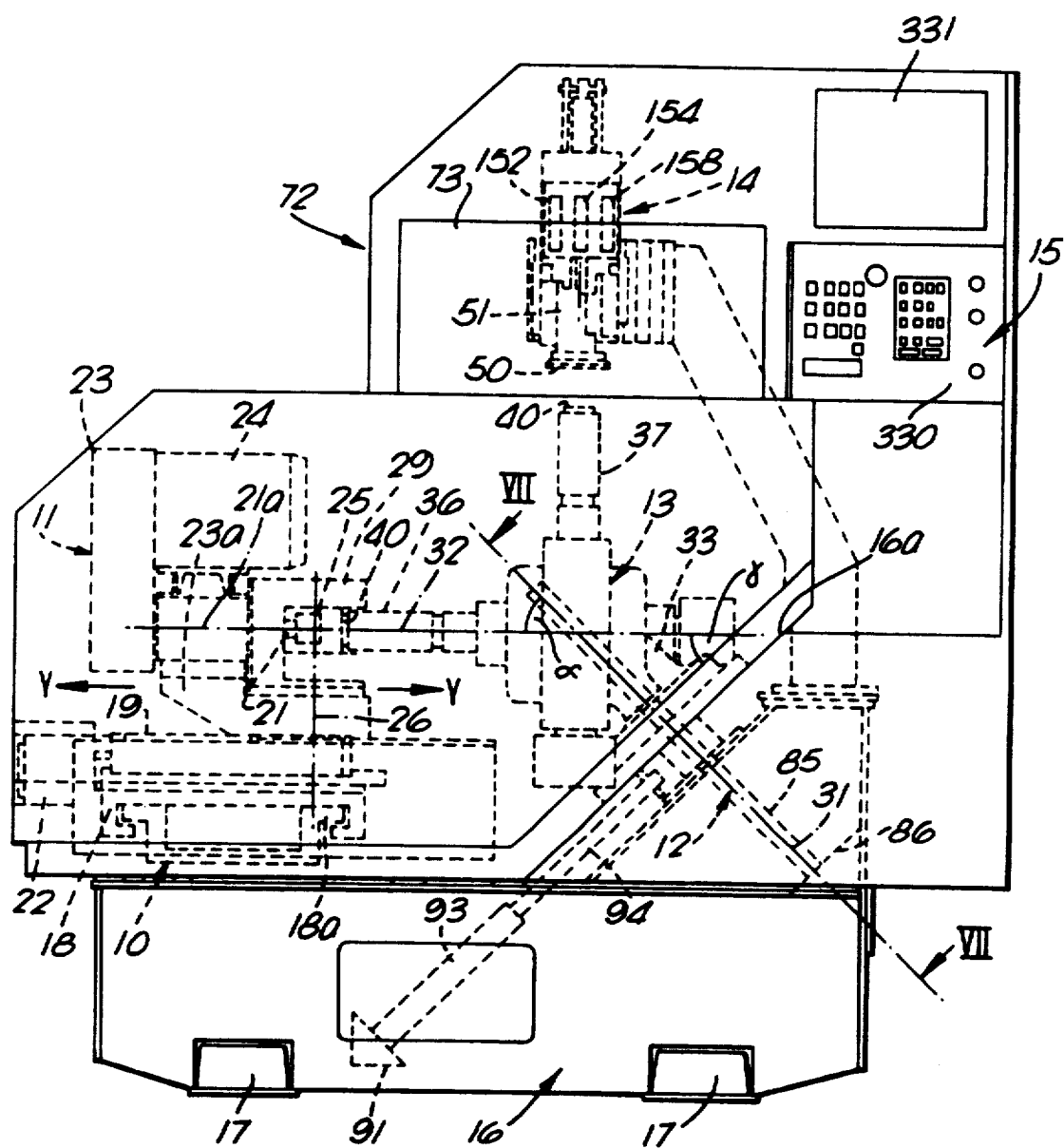
FIG. 1 is an elevation of a lens generating machine incorporating apparatus for sensing a lens blank in accordance with the invention.
Figure 2:
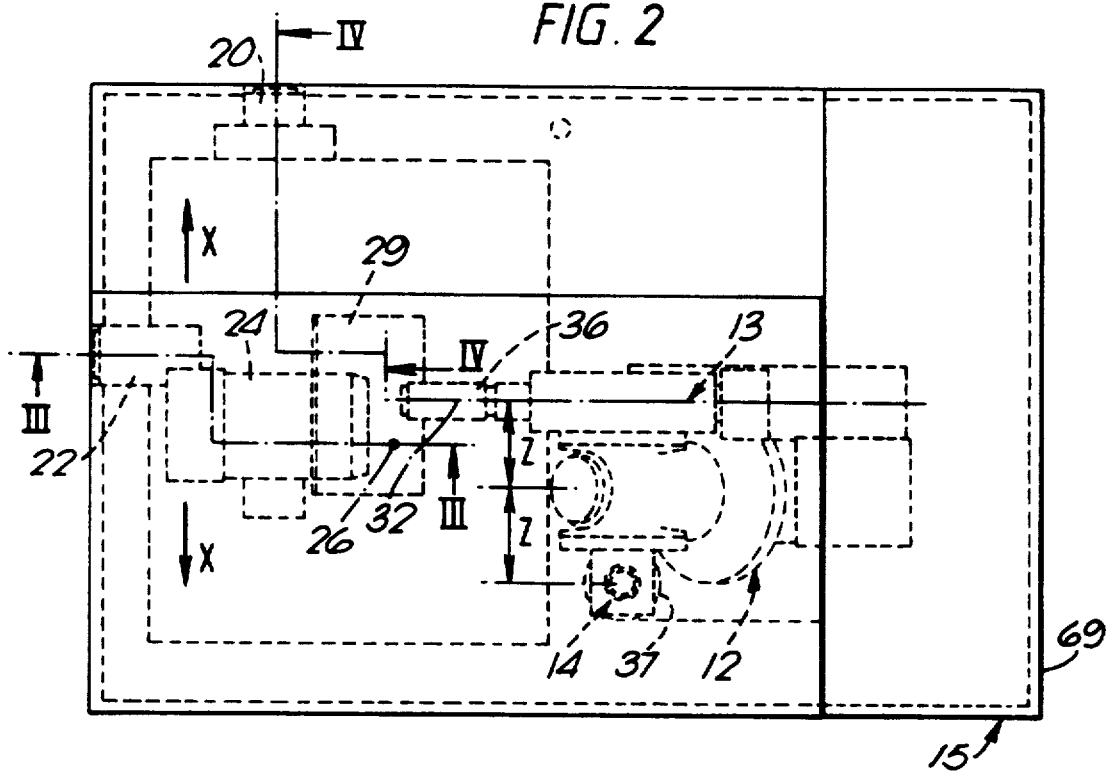
FIG. 2 is a plan view of the machine in FIG. 1.
Figure 5:
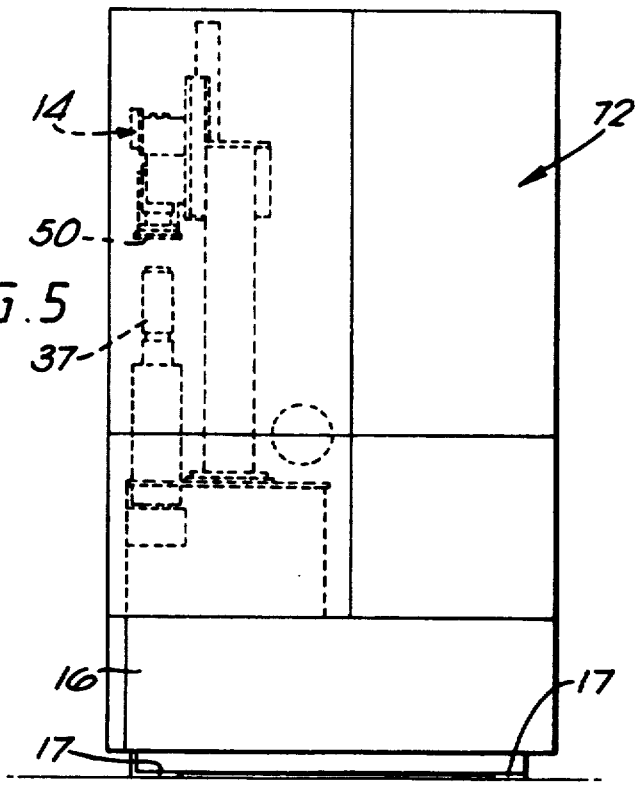
FIG. 5 is a right-hand end view of the machine of FIG. 1.

The machine has a bed 10 mounted on a base 16. A headstock 11 is mounted on the bed 10 and a tailstock 12, lens blank mounting or holder unit 13 and a lens blank sensing apparatus including a sensor unit 14 and a control section 15 is mounted on base 16. The base 16 has feet 17.

Figure 4:
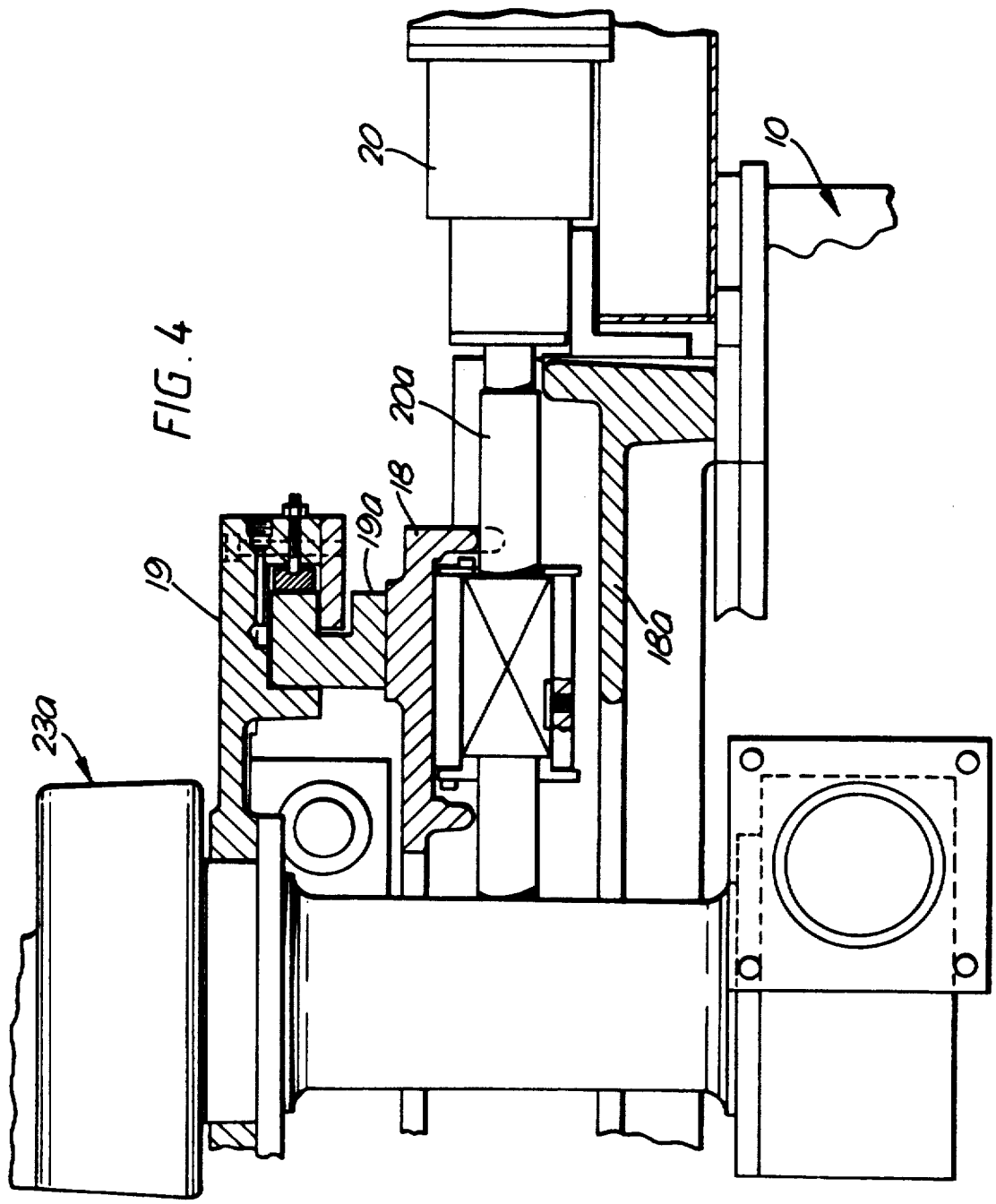
FIG. 4 is a cross-section of part of the machine on FIG. 2 on the line IV-IV in FIG. 2.
Figure 10:
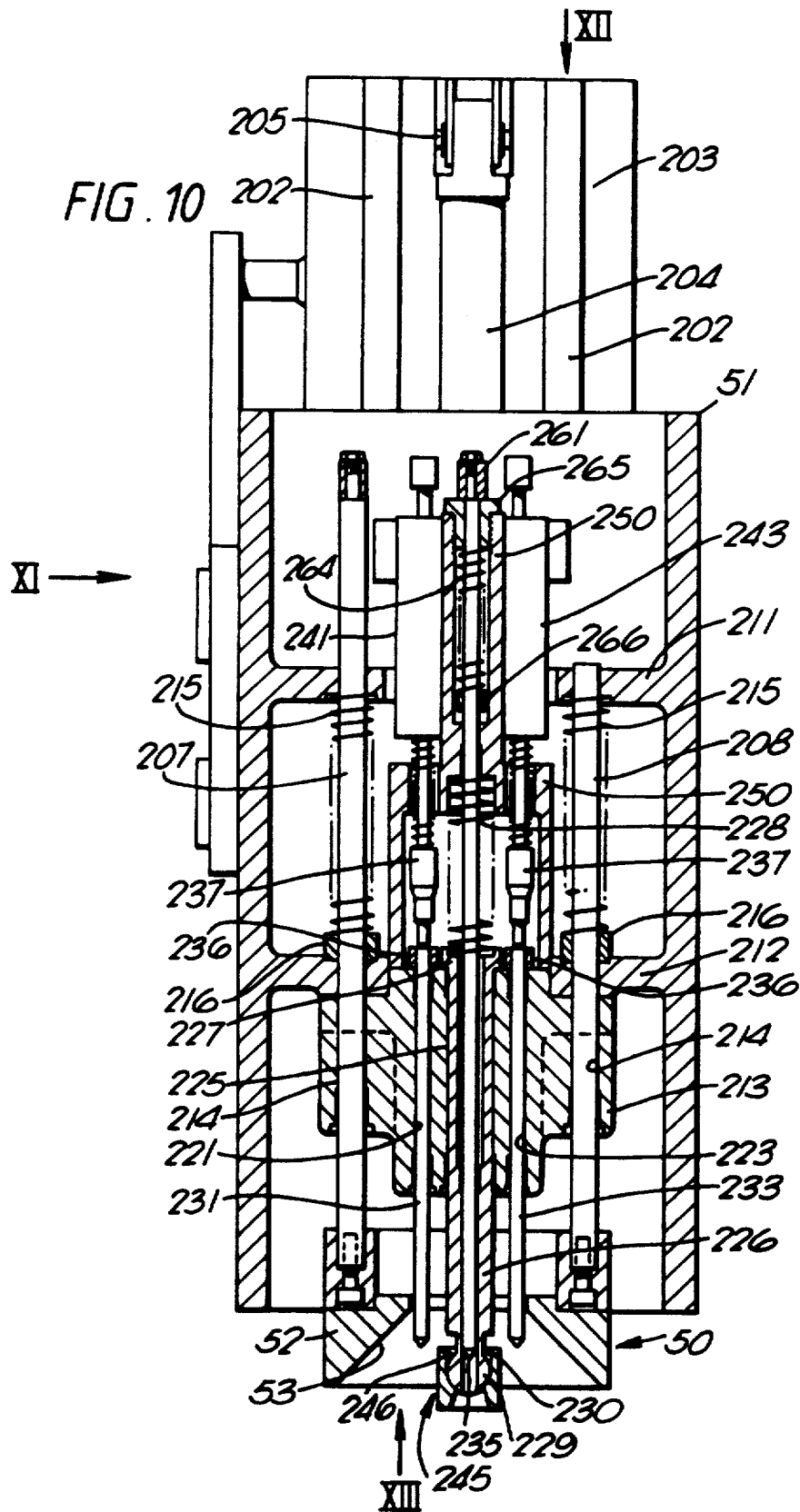
FIG. 10 is a cross-section through an alternative lens blank sensing unit.

As shown in FIGS. 1 to 6 the headstock 11 comprises a first slide 18 mounted on a slideway 18a on the bed 10 and which moves in the transverse directions X—X. Fixed to the slide 18 is another slideway 19a carrying a further slide 19 which moves at right angles to the slide 18 in directions Y—Y. Such movement of slides 18, 19 is effected by respective stepper motors 20, 22. The motors turn respective screw threaded shafts 20a, 22a for moving the slides and are controlled by signals received from the control section 15. The slide 19 supports a spindle unit 23 (a base part 23a of which is shown in FIGS. 3 and 4) including a drive motor 24 which drives a spindle 21 for rotating a cup-shaped grinding wheel 25. The spindle unit is mounted for pivoting on the slide 19 about a vertical axis 26. As can be seen from FIG. 6 the axis 26 passes through the centre of curvature 27 of a nose 28 of the grinding wheel when the latter is mounted on the driving spindle 21. Swinging or pivotal movement of the spindle unit 23 about the axis 26 is effected by a further stepper motor 80. The motor 80 drives a vertical shaft 83 the upper end of which is drivably connected to the base part 23a of the spindle unit 23. The stepper motor 80 is controlled by the control section 15. In FIG. 6 such swinging movement is indicated by W. Two or more limit switches (not shown) may be provided for determining the limits of the swinging movement and are associated with the control section 15. The spindle unit 23 is swingable about axis 26 from a zero datum position shown as W=0 in FIGS. 6 to +W or −W angular positions either side of the datum. The slide 18 is movable by motor 20 in the X direction either side of the X=0 datum to desired positions and the slide 19 is movable by motor 22 in the Y direction either side of a datum shown as Y=0 in FIG. 6. The normal rest or home position of the grinding wheel 25 is with the axis 26 at the intersection 28 of the X=0, Y=0 datums. As shown in FIG. 6 the centre of curvature 27 is shown at a selected X position with Y=0. The wheel 25 is positioned within a housing 29.

In FIGS. 1, 7 and 8 the tailstock 12 is shown having a shaft 85 which is disposed in a vertical plane and has an indexing axis 31 inclined at an angle of 45° to a horizontal plane containing the axis 32 of a horizontal lens blank holder 36 to be described hereinafter. The shaft 85 is shown in detail in FIG. 7. The lower end of the shaft 85 is fast with an anchor socket 86 bolted to the base 10 of the machine. An intermediate section 87 of the shaft is housed within a sleeve 88 bolted to a plate 16a on the base, arranged at an angle (45°) to the aforesaid horizontal plane. The sleeve 88 and the upper end of the shaft 85 carry respective journal bearings 89, 90 which rotatably support the holder unit 13.

The holder unit 13 comprises a main tubular mounting 33 which engages the bearings 89, 90 and which carries both lens blank holders 36, 37 (parts only of holders 36, 37 being shown in FIG. 7 having respective axis 92, 32). The axis 32, 92 are spaced equidistantly from indexing axis 31 by distances indicated at Z in FIGS. 2 and 7. The two lens blank holders 36, 37 are arranged at right angles to each other as seen in FIG. 1. The holder 36 is shown in FIG. 1 at what is referred to as the machining station and the holder 37 is shown at the loading station.

The mounting 33 is indexable to interchange the position of the holders, indexing being effected in FIGS. 1 to 8 by means of a pneumatic cylinder 93 having a piston rod 94. The cylinder 93 is pivotally connected at 97 to a bracket 91 on the bed 10 and the piston rod 94 is pivotally connected by a pin 95 to the mounting 33. The relative geometrical positioning of the cylinder 93 and mounting 33 is apparent from FIG. 8. To index the holder unit 13, air is initially applied to the cylinder 93 to retract the piston rod 94 thereby turning the mounting 33 in direction G. Once the mounting 33 is turning sufficiently, air pressure is relieved and the momentum of the entire holder unit 13 will be adequate to maintain the rotary motion thereby moving the cylinder overcentre (i.e. past line 96 extending through indexing axis 31 and pivot 97 of the cylinder) where are pressure is re-applied pushing pin 95 in mounting 33 against a stop 99, holding the unit 13 in the newly indexed position. The unit 13 indexes in a clockwise direction to its start position by repeating the indexing operation until the pin 95 engages a further stop 100. Sensors 101, 102 sense when the unit 13 is fully indexed. In the absence of a signal from the appropriate sensor, machining of the lens blank cannot take place.

Instead of using the cylinder to effect indexing, the holder unit 13 may be indexed by means of an indexing device 300 shown in FIG. 8A. In FIG. 8A the indexing device 300 is mounted on the base 16 and comprising a driving motor 301 which imparts drive to a cam indexing unit 302 drivably connected to the holder unit 13. The indexing device may be of a proprietary kind to facilitate positive indexing with minimal backlash in the drive transmission.

Stationary microswitches or other sensors 303, 304 are provided for co-operation with a projection 305 on a plate 13a which rotates with the holder unit 13 to sense when the unit 13 is fully indexed. In the absence of a signal from from the appropriate sensor, machining of the lens blank cannot take place.

Each of the holders 36, 37 has a collet chuck 40 at its fee end which grips a metal button 42 to which an appropriate lens blank 43 has been secured or "blocked" by low melting point alloy. The button 42 may be formed with sockets 44 which receive location pins 45 of the holder. The lens blank is blocked on to the button 42 in a particular position by a separate process so that the blank will be suitably orientated relative to the button and sockets 44. When the button is placed on the holder, the pins 45 ensure that the lens blank orientation remains correct for the generating step which is achieved by sweeping the grinding wheel 25 across the surface of the blank. If desired alternative forms of location for the button may be used. The operation of the grinding wheel is described below.

It will be noted that the axis 32 and an axis 21a of the spindle 21 lie in a common horizontal plane.

In FIG. 9, the sensor unit 14 comprises a sensing head 50 which is coaxial with the collet chuck 40 of the holder 37 (and 36 when the latter occupies the loading position). The head 50 is mounted on a movable carriage 51 and comprises an outer ring 52 formed with a frusto conical inner surface 53 inclined e.g., at 45° to the axis 320 of the head. The ring 52 slidably supports a probe in the form of an annular sleeve 54 having a radiused lower end 55. The sleeve 54 slidably engages a tube 56 which has an annular pressure pad 57 at its lower end. The tube 56 slidably houses a central probe 58 which has a radiused lower end 59. The ring 52, sleeve 54 and probe 58 are associated with respective linear measuring devices such as linear potentiometers 152, 154 and 158, which are fixed to the head 50. The tube 56 is biased downwards relative to the carriage by a spring 60 and the ring 52, sleeve 54 and probe 52 may also be resiliently biased downwardly by means (not shown). Datum positions for the ring 52, sleeve 54 and probe 58 are set using a calibration disc as described with respect to FIGS. 10 to 14.

With a lens blank and button mounted loosely in holder 37, the carriage 51 is moved downwardly so that the pressure pad 57 presses firmly against the lens blank indicated at 61. The firm pressure of the pad 57 ensures that the rear face of the cast low melting point alloy button 42 is urged firmly against a shoulder 62 on the collet chuck 40 and the sockets 44 are correctly located on pins 45. The button is then clamped by the collet chuck. Downward movement of the carriage 51 is continued so that the lower ends 55 and 59 of the sleeve and probe and the frusto conical surface 53 engage the lens. The probe 58 thereby engages the centre of the lens blank 61, the sleeve 54 engages the lens blank at an off centre position and the surface 53 engages the edge of the lens blank. Such movement of the carriage 51 causes the various elements to move from their datum positions. The distance moved is sensed from signal changes at the measuring devices 152, 154 and 158 and the results from the latter are fed to the control section 15. The up and down movement of the carriage 51 may be effected electrically or by fluid operable means under the control of the control section. Once the readings from the linear measuring devices have been entered by the section 15, the carriage 51 is lifted to disengage the sensor unit from the lens blank 61.

FIG. 10 to 14 illustrate an alternative and preferred form of sensor unit and parts in FIGS. 10 to 14 which correspond to parts in FIG. 9 carry the same reference numerals.

The alternative sensor unit in FIGS. 10 to 14 includes a sensing head 50 which is coaxial with the collet chuck 40 of the holder 37 (and 36 when the latter occupies the loading position). The head 50 is mounted on a carriage 51 which has vertical slideways 200 slidable up and down vertical rails 202. The rails 202 are mounted on a support 203 on the bed 10 of the machine. The carriage 51 is drive by means of a fluid operable cylinder 204 which has its upper end connected to the support 203 by a pin 205 and its pushrod end connected to a pin 206 on the carriage 51.

Figure 11:
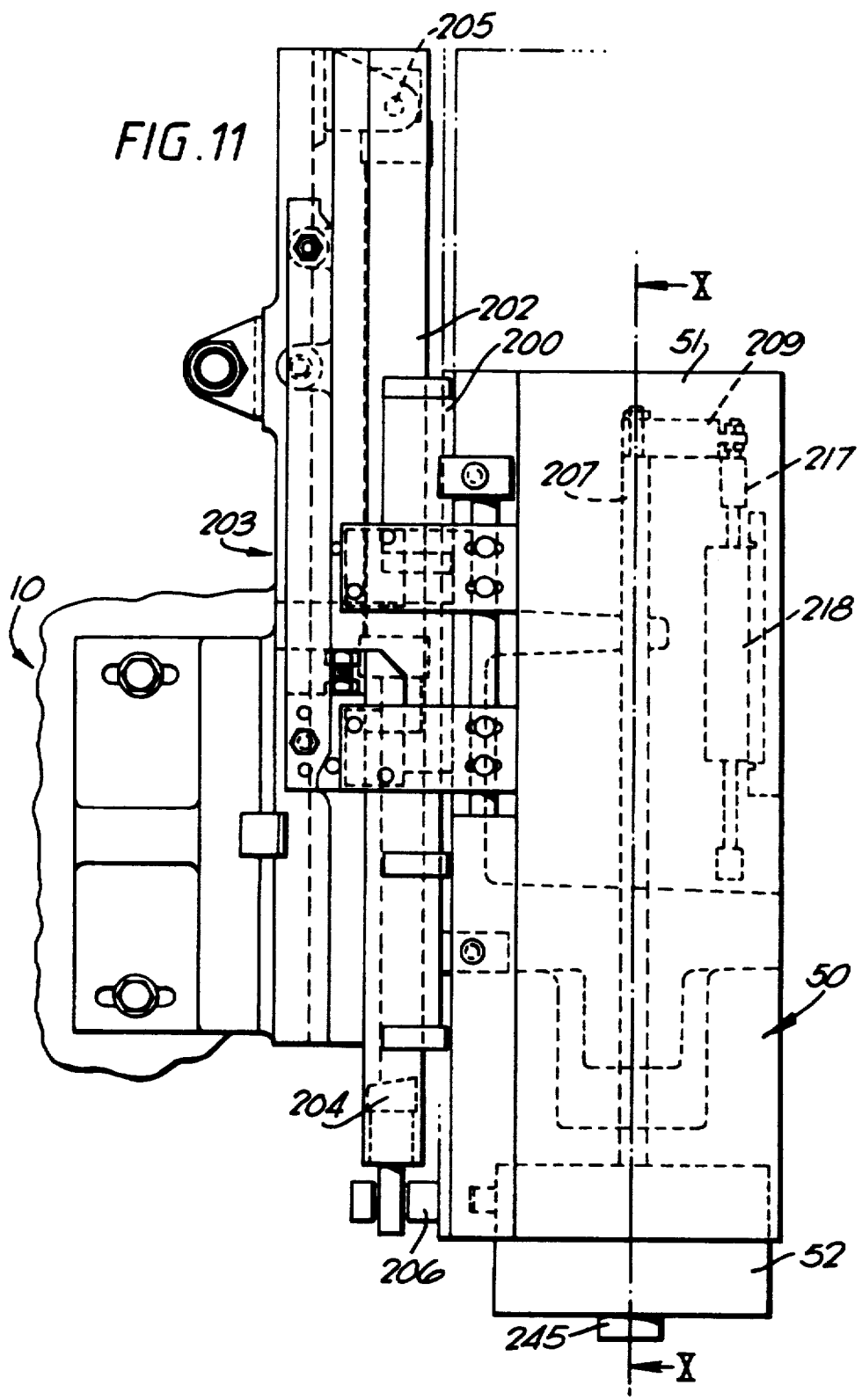
FIGS. 11 to 13 are views of the sensing unit of FIG. 10 looking in the direction of arrows XI, XII and XIII respectively in FIG. 10.
Figure 12:
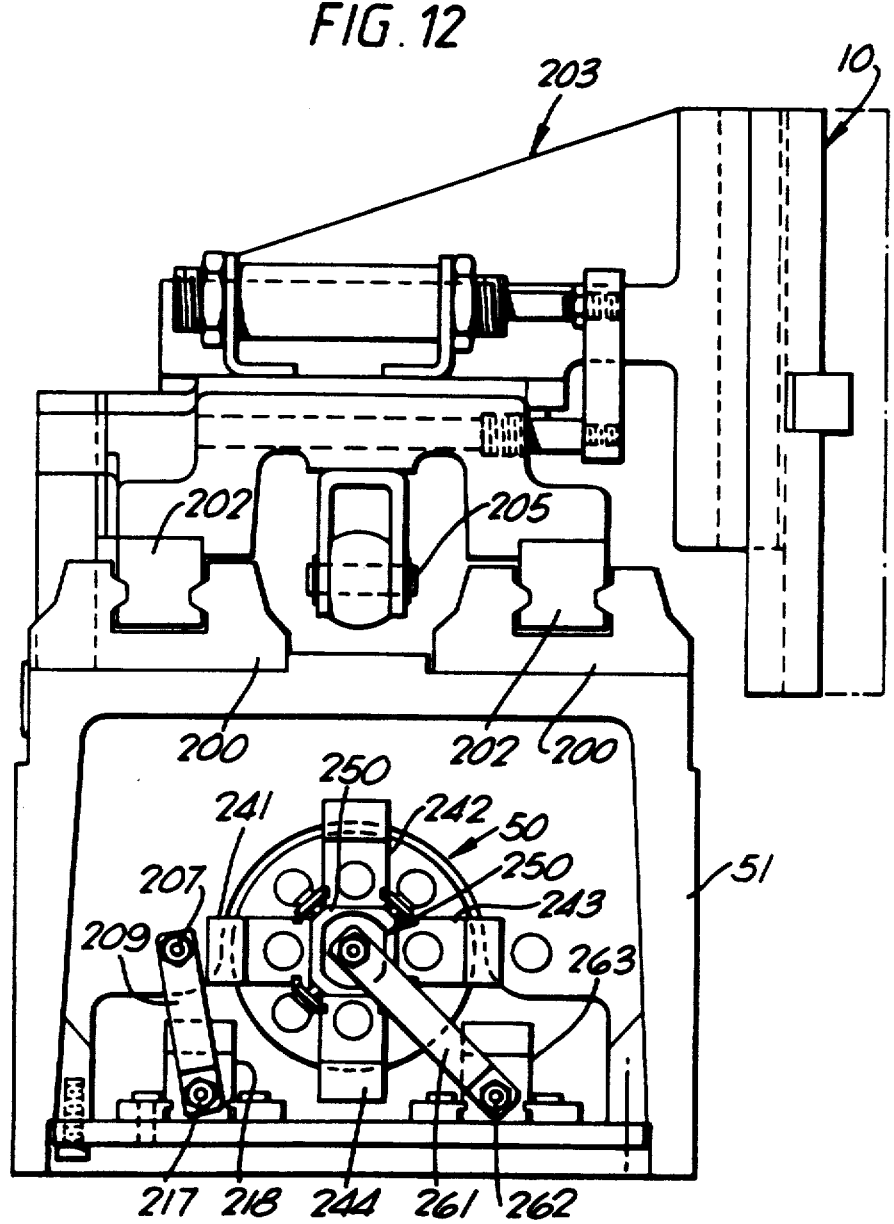
Figure 13:
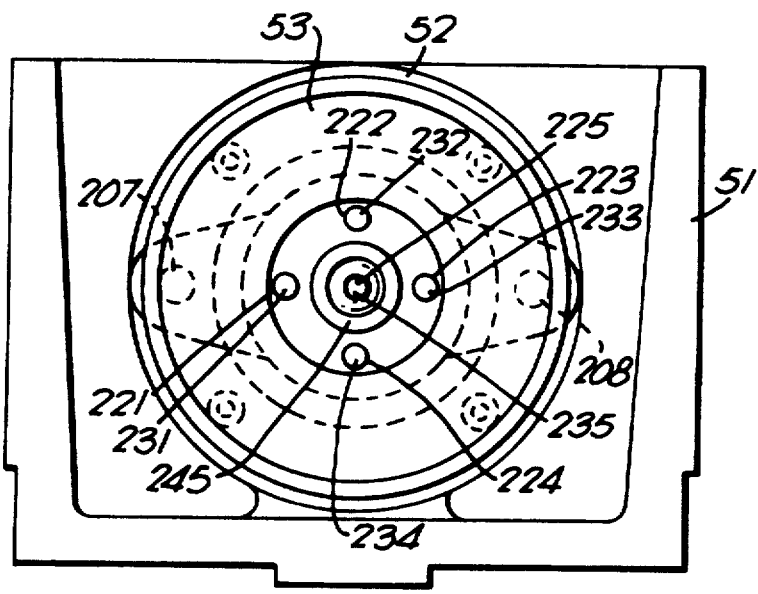

The head 50 includes a ring 52 formed with a frusto conical inner surface 53 inclined, e.g. at 45° to the axis of the head. The ring 52 is slidably supported on the carriage 51 by two vertical bars 207, 208 upper sections of which are slidably mounted in respective bores in a transverse web 211 of the carriage. The web 212 spigotally locates a guide block 213 having bores 214 therein in which the respective bars 207, 208 locate and extend slidably. The bars 207, 208 are biased normally downwards by means of compression springs 215 which act between the web 211 and abutments 216 on the respective bars. The bar 207 is longer than the bar 208 and is connected at its upper end to one end of an arm 209 (FIGS. 11 and 12). The other end of the arm is connected to an input member 217 of a linear potentiometer 218 mounted on the carriage 51.

The guide block 213 is formed with five further bores four of which (221 to 224) are arranged on a pitch circle coaxial with the fifth bore 225. The bores 221 to 224 slidably receive respective probes 231 to 234 which have lower hardened ball ends and have upper ends which are axially fast with collars 236. The probes 221 to 224 are biased normally into the positions shown by spring loaded plungers 237 attached to input members of respective linear potentiometers 241, 243 fixed to a tubular pedestal 250 mounted on the carriage 51 between webs 211 and 212. The arrangement of the potentiometers 241 to 244 on four sides of the pedestal 250 can be seen in FIG. 12.

The bore 225 receives a tube or sleeve 226 having an annular shoulder 227 at its upper end and normally held in abutment with the guide block 213 by a spring 228 acting between the shoulder 227 and the pedestal 250. The sleeve 226 has a ball-like lower end 229 which locates in a swivel-like manner in a socket 230 of a foot 245. The foot 245 is retained axially on the ball 229 by a pin 246. The sleeve 226 slidably contains a centre probe 235. The probe 235 has a lower hardened ball end and has its upper end connected to one end of an arm 262. The other end of the arm is connected to an input member 262 of a linear potentiometer 263 fixed to the carriage 51. The probe 235 is normally biased downwardly into the FIG. 10 position by a spring 264 acting between a colar 265 on the pedestal 250 and an abutment 266 on the probe 235.

The use of the sensor unit of FIGS. 10 to 14 is now described.

A lens blank 62 (FIG. 14) is mounted in the holder 37 as before. The carriage 51 is moved downwardly so that the foot 231 presses firmly against the lens blank compressing spring 228. The lens mounting button is then clamped by the collet chuck 40. Downward movement of the carriage 51 causes the frusto conical surface 53 of the ring 52 to engage the edge of the lens blank. Downward movement of the carriage relative to the ring 50 is continued still further against the bias of springs 215 so that the lower ends of all the probes 231-235 engage the lens blank surface to be machined. A surface 51a finally engages an adjustable screw stop 51b to present further downward movement. The initial, i.e. datum, positions of all the probes is set by moving the carriage into its downward position against the stop 51b with all the probes and the conical inner surface 53 engaging a calibration disc (not shown) of known thickness and diameter placed on the collet chuck 40 at the loading station. The distance moved by the linear potentiometers relative to their respective input members is known from signal changes which vary according to the distance moved from the datums.

Once the readings from the linear potentiometers have been entered by the section 15 the carriage is lifted.

Figure 14:
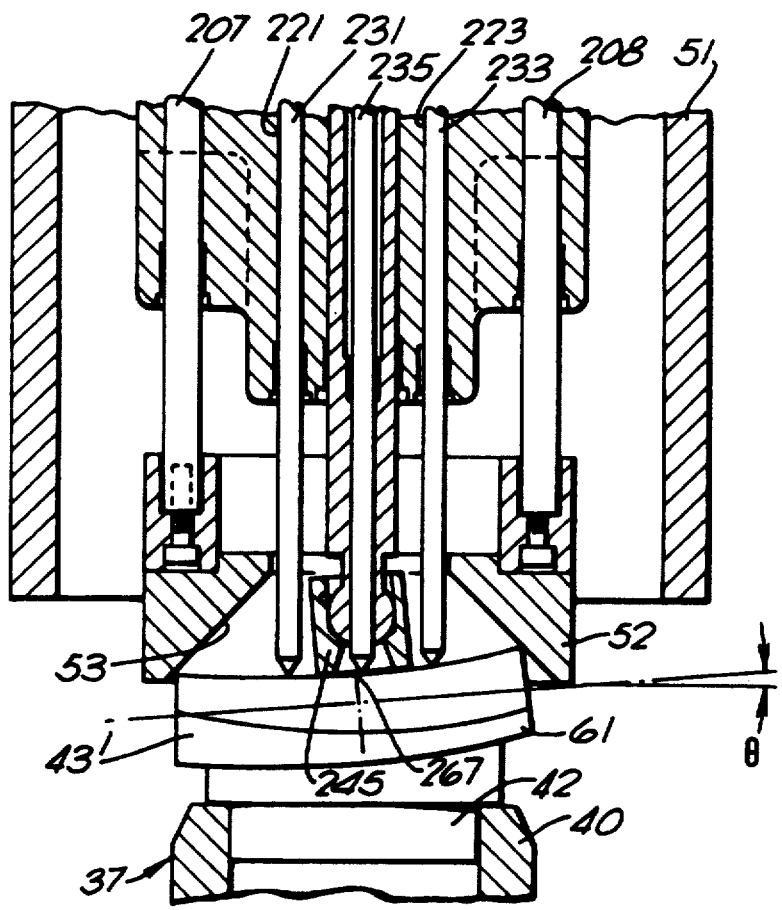
FIG. 14 is a view of part of the sensing unit of FIG. 10 in a lens blank sensing position and FIG. 15 is a block diagram of a control system for the machine.

The lens blank 61 in FIG. 14 is shown tilted by angle so that "prism" will be formed when generating the lens. The probes 231 to 234 will be positioned accordingly in such a case, the movement from the datums for those probes being different from each other. With the lens blank tilted, the conical surface 53 will not engage the entire edge of the lens blank 61.

It is further envisaged that the sensing unit could be used to determine the curvature of a generated surface and/or any prism of the lens so that it can be used to check a lens once it returns to the loading station after machining. The terms lens blank used herein also embraces such a generated lens.

Figure 15:
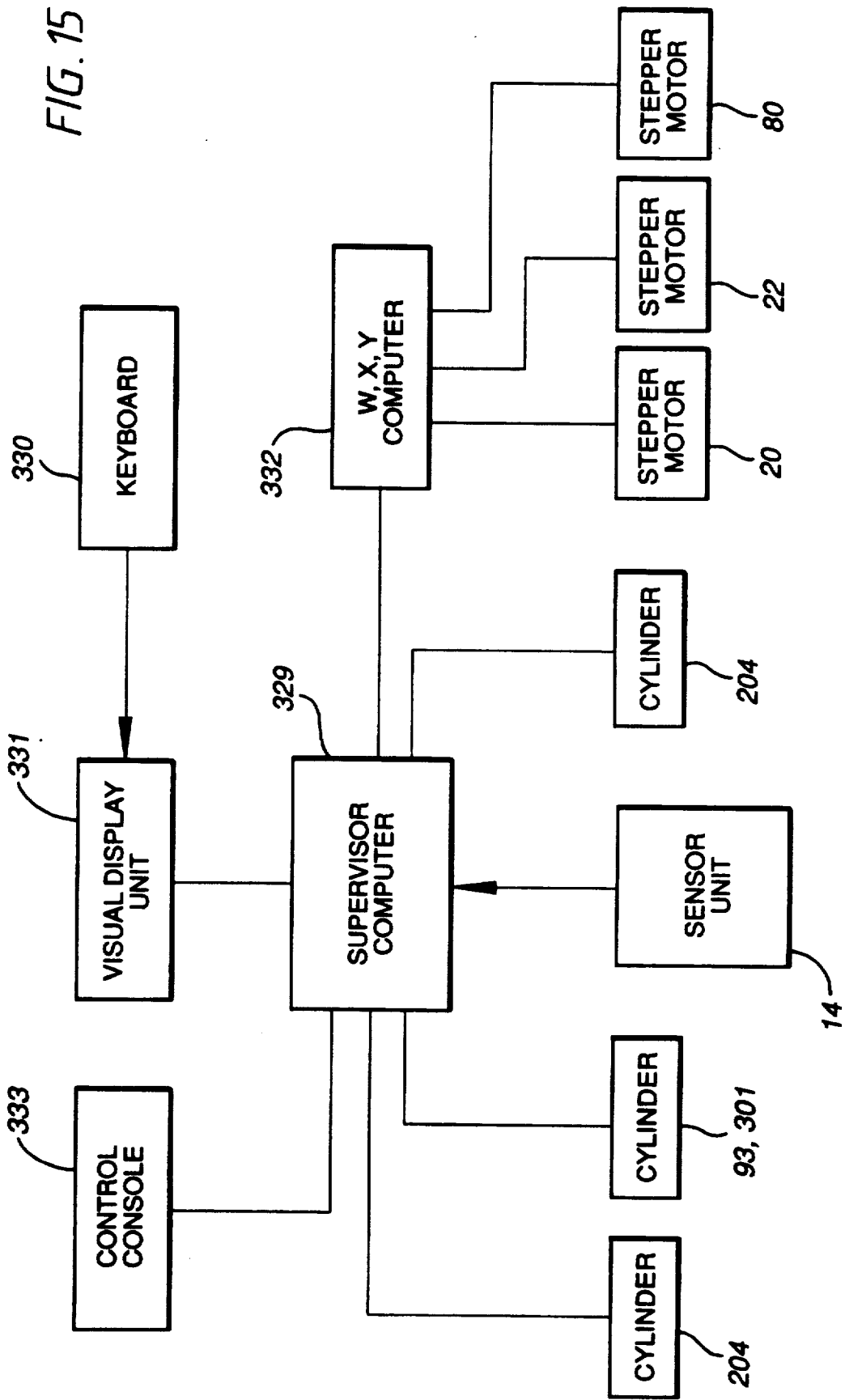

The control section 15 is shown diagrammatically in FIG. 15 and operation is as follows:

The operator of the machine receives a ready blocked lens blank together with data to enable e.g., a minus, or concave, surface to be ground on the blank with the correct prescription curvature or a plus or convex surface. The machine is particularly concerned with the grinding of a toric lens surface having base and cross curves as defined below to be ground on the lens blank. The lens blank is placed in position in the holder at the loading station and the carriage 51 is lowered to provide readings by means of the sensor unit 14 from the upwardly facing surface of the blank. Those readings are fed to a supervisor computer 329 and held in a memory. The operator uses a keyboard 330 to enter in the supervisor computer 320 the data accompanying the lens which appears on a visual display unit 331. The data supplied with the lens will include the power of the base curve in diopres (D) e.g., −3.00D. and the power of the cross curve in diopres e.g., −5.75D. The supervisor computer uses the information fed to it to set the angle of swing of the grinding wheel in direction +W or −W to set e.g., the correct base or cross curvature for the lens, and the movements X, Y of the slides to obtain what is known as the required cross or base curve radius for the lens with the grinding wheel initially set at the foregoing angle. As is known in the art the base curve is the curve of least power and the cross curve is the curve of greatest power. The outputs from the supervisor computer 329 relating to the W, X, Y, movements are fed to a W, X, Y computer 332 which controls the stepper motors 20, 22 and 80. The supervisor computer also generates signals for dictating the sequence in which the various operations taken place, e.g., operation of cylinder 204 for raising and lowering of carriage 51, operation of the collet chuck 40 at the loading station, starting/stopping of grinding wheel sweep and operation of cylinder 93 or motor 300 for indexing of holder unit 13.

The reading from potentiometer 218 is used to provide an indication of the diameter and height of the lens blank edge which is used by the supervisor computer 329 in conjunction with readings from the other potentiometers as detailed below to calculate the position of the grinding wheel at the correct position in the X and Y directions for the start and finish of a grinding sweep. The reading from potentiometer 263 is used to provide an indication of the height h of (FIG. 6) of the lens blank at its centre. Distance d known as a "register height" is a known distance and the curvature of the face (rear race) of the lens adhered to the button 42 is also known as it is normally a pre-formed spherical surface coated with a protective layer of lacquer. The register height d is constant for lenses blocked on the same blocking machine and is entered into a memory of control section 15. The readings from potentiometers 241-244 together with the readings from potentiometers 218 and 263 are used to calculate the sphere curvature of the front face of the lens blank,. Any prism setting giving a tilt to the lens blank is sensed by the probes 241-244. The sensor unit shown in FIG. 9 will provide signals in a similar way but will not sense prism as there is only one intermediate probe in the form of sleeve 54.

Once the various parameters have been entered into the control section 15, operation of the keyboard 330 then causes the tailstock to index the holder unit 13 to move holder 37 to the machining station and holder 36 to the loading station. The control system then causes the slides 18, 19 to sweep the rotating grinding wheel across the lens blank a number of times to remove the required amount of glass. The amount of material to be removed is calculated in the control system from the measurements taken by the sensing head 50. The power of the rear face of the lens blank is diopres is known from the data accompanying the lens blank. Power is related to curvature and as the distance d is known and bearing in mind that the diameter Q of the lens button 42 will be constant, the position of the centre point 267 of the rear face of the lens will be determined by the supervisor computer. Grinding is continued until sufficient material has been removed to reduce distance h so that the correct lens thickness t is achieved. In FIG. 6 the finished lens is indicated at $43^1$.

Although specific reference has been made to removing material to leave a specific thickness t, the probes could be used simply to sense the position and curvature of the lens blank to enable one or more grinding sweeps be made to remove a given amount of material. This is a useful option if it is merely desired to grind a small amount of material off a lens blank of known thickness.

As the grinding wheel 25 follows the path determined by X,Y movement it is also necessary to adjust its angular position (W) by means of the stepper motor 80 in order to maintain a consistent curve for the full sweep of the grinding wheel. On conventional lens generating machines, the angle of the grinding wheel relative to the lens blank axis will automatically vary during a sweep because the spindle unit will itself be pivoting about a point corresponding to the centre of curvature of the base or cross curve. With the present invention, the wheel 25 will be moved angularly so that its angular position at any point during the sweep will correspond substantially to that which would apply if it were being swung about the centre of curvature of the curve being generated.

While the first lens blank is being machined the next lens blank is placed in the vertical holder 36, (after removing the previously machined lens if necessary) the data for that lens blank is entered into the control system and the sensing head 50 is operated to take the required readings. The new lens blank can be indexed into the machining station after the first lens blank has been machined.

The overall speed at which the machining takes place can be controlled at the keyboard.

The machine has a casing 72 which includes a door 73 which can be operated automatically or by manual override to give access to the holder at the loading station. For safety, switching may ensure that the lens blank cannot be indexed or machined with the door open.

It is envisaged that lenses could be fed automatically to the loading station from loading trays and the control section could be fed with information concerning the respective lenses from a remotely located control console 333. The blanks would be loaded by a robotic device in the correct order and the completed blanks removed and placed back into their original trays to preserve the order for subsequent finishing stages.

Although an operator of the machine could measure the lens blank of the machine to obtain the necessary parameters needed to enable the machine to be set correctly for that lens, the provision of the sensing apparatus on the machine, and the ability of the control system to compute the information derived, reduces greatly the time which would would otherwise be needed to derive the parameters and set the machine.

Although specific reference has been made to the use of probes on the sensing head, it is envisaged that sensing means such as light-reflective devices could be used instead to sense points in the lens surface. Also it is envisaged that the machine could use a single lens holder indexable between loading and machining stations.

I claim:

1. Apparatus for sensing a lens blank, comprising:
a holder for a lens blank;
a carriage;
means for effecting relative movement between the carriage and holder toward and away from one another;
first sensor means, mounted on said carriage, arranged to sense a peripheral edge of a lens blank carried by said holder;
second sensor means, mounted on said carriage, arranged to sense surface portions of the lens blank inboard of said peripheral edge;
said second sensor means including a plurality of probes movably mounted on the carriage and engageable with different spaced inboard surface portions of the lens blank;

means for sensing relative displacement between each said probe and said carriage and providing output signals indicative of said displacement; and
signal processing means for receiving said output signals.

2. Apparatus according to claim 1, wherein at least one of said probes is a central probe arranged to engage a surface portion of the lens blank at or adjacent a central position thereof.

3. Apparatus according to claim 2, wherein the second sensor means includes a probe in the form of an annular sleeve encircling said central probe.

4. Apparatus according to claim 2, wherein the second sensor means includes a plurality of further probes spaced apart around said central probe and arranged to engage different surface portion of the lens blank at off-center positions.

5. Apparatus according to claim 1, wherein there is mounted on the carriage a holder member to engage the lens blank and hold it securely to said holder when the lens blank is engaged by said probes.

6. Apparatus according to claim 5, wherein at least one of said probes is a central probe arranged to engage a surface portion of the lens at or adjacent a central position thereof, and wherein said central probe is surrounded by a tube on which the holding member is mounted.

7. Apparatus according to claim 5, wherein said holding member is formed at one end thereof with a foot which is engageable with a surface portion of the lens blank.

8. Apparatus according to claim 7, wherein said foot is mounted on the holding member by means of a universal swivel joint.

9. Apparatus according to claim 1, wherein said first sensor means includes an element having a frusto-conical surface engageable with the peripheral edge of the lens blank.

10. Apparatus according to claim 1, wherein said first sensor means are movable mounted on said carriage.

11. Apparatus according to claim 1, wherein said signal processing means are arranged to receive data relevant to the lens to be formed from the lens blank, in addition to said output signals.

12. A machine for machining a lens blank, the machine including a first holder for a lens blank, a machining station where the lens blank in the first holder is to be machined, a loading station where the lens blank can be loaded in the first holder for sensing by leans blank sensing apparatus, holder moving means for moving the first holder from the loading station to the machining station, and means for controlling the machining in response to signals including those received from the sensing apparatus, said sensing apparatus being located at the loading station and comprising:
a carriage;
means for effecting relative movement between the carriage and said first holder towards and away from one another;
a first sensor means, mounted on said carriage, arranged to sense a peripheral edge of a lens blank carried by said first holder;
second sensor means, mounted on said carriage, arranged to sense surface portions of the lens blank inboard of said peripheral edge;
said second sensor means including a plurality of probes movably mounted on the carriage and engageable with different spaced inboard surface portions of the lens blank;

means for sensing relative displacement between each said probe of said carriage and providing output signals indicative of said displacement; and signal processing means for receiving said output signals.

13. Apparatus according to claim 12, wherein the machine includes a movable mounting for a tool and drive means for moving the mounting.

14. Apparatus according to claim 13, wherein said signal processing means is arranged to provide an output for controlling the machining of the lens blank, in which the output is used to control the drive means.

15. Apparatus according to claim 13, wherein the mounting is arranged on two slides controlled by respective drive means.

16. Apparatus according to claim 13, wherein the mounting is movable pivotably to engage the tool to be pivoted.

17. Apparatus according to claim 13, wherein the first and second holders are arranged so that when one of the holders is positioned at the loading station the other is portioned at the machining station.

18. Apparatus according to claim 17, wherein said holder moving means is arranged to interchange the position of the holders.

19. Apparatus according to claim 16, wherein the pivotal movement of the mounting is effected by an associated drive means.

20. Apparatus according to claim 20, wherein said first holder is carried by a mounting.

21. Apparatus according to claim 20, wherein the mounting is indexable about an axis.

22. Apparatus according to claim 21, wherein the axis is inclined to said first holder.

23. Apparatus according to claim 22, wherein the indexing axis is arranged at 45° to said first holder.

24. Apparatus according to claim 21, wherein drive means is provided for performing the indexing movement in response to an output from said signal processing means.

25. Apparatus according to claim 12, wherein the machine includes a second holder for a second lens blank.

26. Apparatus according to claim 25, wherein said machine includes a movable mounting for a tool and drive means for moving the mounting, and said mounting carries the first and second holders.

27. Apparatus according to claim 26, wherein each holder, when at the holding station, extends vertically and each holder, when at the machining station, extends horizontally.

* * * * *

UNITED STATES PATENT AND TRADEMARK OFFICE
CERTIFICATE OF CORRECTION

PATENT NO. : 5,144,561

DATED : 09/01/92

INVENTOR(S) : Peter Henry Hunt Soper

It is certified that error appears in the above-identified patent and that said Letters Patent is hereby corrected as shown below:

Title page, item [75], inventor's address should be --Warwickshire, England--

Column 4, Line 58, Delete "are" Insert --air--

Column 4, Line 67, Delete "cylinder" Insert --cylinder 93--

Column 5, Line 12, Delete "from from" Insert --from--

Column 6, Line 20, Delete "is drive" Insert --is driven--

Column 7, Line 56, Delete "computer 320" Insert --329--

Column 7, Line 59, Delete "-3.00⊃D." Insert ---3.00⊂D--

Column 8, Line 23, Delete "(rear race)" Insert --(rear face)--

Column 8, Line 31, Delete "blank,." Insert --blank.--

Column 9, Line 42, Delete "would would" Insert --would--

UNITED STATES PATENT AND TRADEMARK OFFICE
CERTIFICATE OF CORRECTION

PATENT NO. : 5,144,561
DATED : September 1, 1992
INVENTOR(S) : Peter Henry Hunt Soper It is certified that error appears in the above-indentified patent and that said Letters Patent is hereby corrected as shown below:

Column 12, Line 4, Delete "claim 20" insert --claim 12--

Signed and Sealed this

Twenty-first Day of December, 1993

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,144,561

DATED : September 1, 1992

INVENTOR(S) : Peter Henry Hunt Soper

It is certified that error appears in the above-indentified patent and that said Letters Patent is hereby corrected as shown below:

On the title page, item [73], delete "S. Jones-Robinson & Co." and insert --Norville Optical Co. LTD--

Signed and Sealed this

Tenth Day of May, 1994

Attest:

BRUCE LEHMAN

Attesting Officer

*Commissioner of Patents and Trademarks*